(12) United States Patent
Lu et al.

(10) Patent No.: US 11,972,651 B2
(45) Date of Patent: Apr. 30, 2024

(54) INTELLIGENT KEY DEVICE AND VERIFICATION METHOD THEREFOR

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 189 days.

(21) Appl. No.: 17/431,378

(22) PCT Filed: Jan. 3, 2020

(86) PCT No.: PCT/CN2020/070169
§ 371 (c)(1),
(2) Date: Aug. 16, 2021

(87) PCT Pub. No.: WO2021/077627
PCT Pub. Date: Apr. 29, 2021

(65) Prior Publication Data
US 2022/0245977 A1 Aug. 4, 2022

(30) Foreign Application Priority Data
Oct. 21, 2019 (CN) .......................... 201911002653.2

(51) Int. Cl.
*H04L 9/32* (2006.01)
*G07C 9/00* (2020.01)

(52) U.S. Cl.
CPC ........ *G07C 9/00563* (2013.01); *H04L 9/3273* (2013.01); *H04L 9/3297* (2013.01)

(58) Field of Classification Search
CPC ... H04L 19/3231; H04L 9/3273; G06F 21/52; G06F 21/32
See application file for complete search history.

(56) References Cited

U.S. PATENT DOCUMENTS

| | | | | |
|---|---|---|---|---|
| 7,478,233 | B2* | 1/2009 | Olson | H04L 63/123 713/161 |
| 9,197,414 | B1* | 11/2015 | Martin | H04L 9/12 |
| 10,146,924 | B2* | 12/2018 | Corcoran | G06F 21/32 |
| 10,609,070 | B1* | 3/2020 | Farmer, III | H04L 63/126 |
| 11,245,700 | B2* | 2/2022 | Takagi | H04L 63/101 |

(Continued)

*Primary Examiner* — Viral S Lakhia
(74) *Attorney, Agent, or Firm* — Hammer & Associates, P.C.

(57) ABSTRACT

An intelligent key device and a verification method therefor. The verification method comprises: determining the type of an instruction by means of an intelligent key device; determining a key area according to the type of the instruction; acquiring a biometric verification identifier corresponding to the key area; determining, according to the biometric verification identifier, a biometric verification mode corresponding to the key area; and executing a corresponding operation according to the biometric verification mode. According to the present invention, a user can realize multiple verification modes of biometric features according to a key area in the process of performing verification using the intelligent key device, such that different verification requirements of the user for the key used in different application scenarios are met.

10 Claims, 2 Drawing Sheets

(56) References Cited

U.S. PATENT DOCUMENTS

| | | | |
|---|---|---|---|
| 2007/0250718 A1* | 10/2007 | Lee | H04L 63/0861 |
| | | | 713/186 |
| 2014/0101453 A1* | 4/2014 | Senthurpandi | G06F 21/32 |
| | | | 713/172 |
| 2019/0379542 A1* | 12/2019 | Michael | H04L 9/3242 |
| 2020/0028681 A1* | 1/2020 | Chen | H04L 63/0861 |
| 2020/0327216 A1* | 10/2020 | Lin | G06F 21/34 |

* cited by examiner

INTELLIGENT KEY DEVICE AND VERIFICATION METHOD THEREFOR

FIELD OF THE INVENTION

The present invention relates to a smart key device and an authenticating method thereof, which relates to information security technical field.

PRIOR ART

A smart key device is a small-scale hardware equipment with a processor and a storage, which can connect to a computer via data communicating interface of the computer. The smart key device completes key generating and secure storage of the key via its built-in single-chip microcomputer or smart card chip. With function of preset encrypting algorithm, computing related to the key is operated inside the smart key device entirely in such way that the smart key device has anti-attacking feature and high security.

In the prior art, the smart key device sets identity an authentication mode for a password area. For example, when the smart key device receives a signing command, the smart key device determines whether the key required by the signing command needs a PIN code authentication, and completes a signing operation by using the key according to a PIN code authentication result. The inventors find a following disadvantage in the identity authentication mode in the prior art, i.e. even though a user has different authentication requirements when using a key in different application scenarios, the modes of the identity authentication set by the key area in the prior art is singlet, which cannot meet the different authentication requirements of the required keys in different application scenarios, resulting in such a fact that a product is not personalized enough and has a bad experience for the user.

SUMMARY OF THE INVENTION

The object of the present invention is to provide a smart key device and an authenticating method thereof, which can satisfy a user in different application scenarios with different requirements of using key.

Therefore, according to one aspect of the present invention, there is provided an authenticating method of a smart key device, which includes the following steps:

s1) receiving, by the smart key device, an instruction sent from a host computer;

s2) determining, by the smart key device, a type of the instruction, when the type of the instruction is an operating instruction related to the key, executing Step s3, while when the type of the instruction is another type of instruction, executing an operation corresponding to the instruction, then going back to Step s1, s3) confirming, by the smart key device, a key area according to the operating instruction related to the key, then executing Step s4;

s4) obtaining, by the smart key device, a biometric authentication identifier corresponding to the key area, confirming a mode of biometric authentication corresponding to the key area according to the biometric authentication identifier, when the mode of biometric authentication is a first mode, executing Step s5; when the mode of biometric authentication is a second mode, executing Step s6; while when the mode of biometric authentication is a third mode, executing Step s7;

s5) obtaining, by the smart key device, an operating key corresponding to the key area according to the operating instruction, executing operation corresponding to the operating key, and returning an operating result to the host computer, then executing Step s1, s6) authenticating, by the smart key device, biometric, determining whether the biometric authentication is successful, if the biometric authentication is successful, recording time of a timer when the biometric authentication is successful, obtaining the operating key corresponding to the key area according to the operating instruction, performing corresponding operation according to the operating key, and returning an operating result to the host computer, then executing Step s1, while if the biometric authentication is not successful, returning an error code, executing Step s1, and s7) obtaining, by the smart key device, a current time of the timer and the recording time of the timer when the biometric authentication is successful, determining whether the biometric authentication is required according to the current time of the timer and the recording time of the timer when the biometric authentication is successful, if yes, executing Step s6; otherwise, obtaining the operating key corresponding to the key area according to the operating instruction, executing operating corresponding to the operating key, and returning an operating result to the host computer, then executing Step s1.

According to another aspect of the present invention, there is provided a smart key device, which comprises:

a receiving module, a determining module, a confirming module, an obtaining module, an authenticating module, an executing module and a sending module, in which the receiving module is configured to receive an instruction from a host computer;

the determining module is configured to determine a type of the instruction received by the receiving module;

the confirming module is configured to confirm a key area according to the operating instruction, obtain a biometric authentication identifier corresponding to the key area, and confirm a mode of biometric authentication corresponding to the key area according to the biometric authentication identifier when the determining module determines that the type of the instruction is an operating instruction related to key;

the obtaining module is configured to obtain an operating key corresponding to the key area according to the operating instruction, and executing operation corresponding to the operating key to obtain an operating result;

the authenticating module is configured to authenticate biometric;

the determining module is further configured to determine whether the authenticating module authenticates biometric successfully;

the obtaining module is further configured to obtain and record time of a timer when the biometric is authenticated successfully when the determining module determines that the authenticating module authenticates biometric successfully;

the obtaining module is further configured to obtain the current time of the timer and record time of a timer when the biometric is authenticated successfully when the confirming module confirms that the mode of the biometric authentication is a third mode;

the determining module further is configured to determine whether biometric authentication is required according to the current time of the timer and the recording time of the timer when biometric authentication is successful;

the sending module is configured to return an operating result to the host computer;

the sending module is further configured to return an error message to the host computer when the determining module determines that the authenticating module authenticates the biometric unsuccessfully; and the executing module is configured to execute corresponding operation when the determining module determines that the type of the instruction is another type of instruction.

According to the present invention, in a process of using a smart key device for authenticating, a user can realize a variety of ways of the biometric authentication according to the key area, which satisfies different biometric authenticating requirements when using a key in different application scenarios.

DETAILED DESCRIPTION OF THE INVENTION

The technical solutions of the embodiments of the disclosure are described clearly and completely in conjunction with the accompanying drawings as follows. Apparently, the described embodiments are merely a part but not all of the embodiments according to the disclosure. Based on the described embodiments of the disclosure, other embodiments obtained by those skilled in the art without any creative work belong to the scope of protection of the present invention.

Embodiment 1

Figure 1:
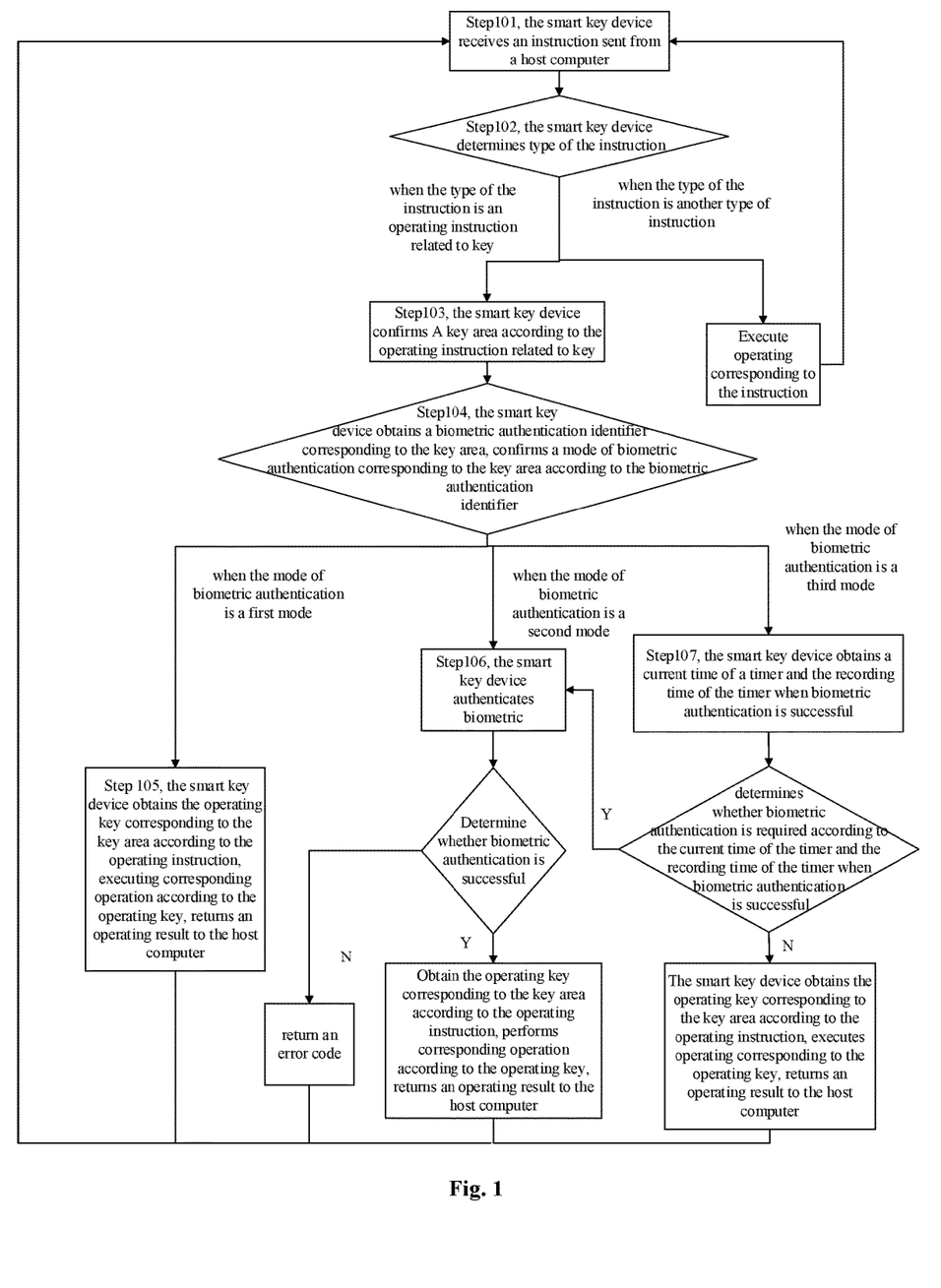
FIG. 1 is a flow chart for an authenticating method of a smart key device according to Embodiment 1 of the present invention.

Embodiment 1 of the present invention provides an authenticating method of a smart key device. The method includes the following steps.

Step 101, the smart key device receives an instruction sent from a host computer;

In Embodiment 1, the instruction received by the smart key device complies with format of APDU, which is CLA INS P1 P2 LC Data Le.

In Embodiment 1, CLA represents application type of the instruction, INS represents executing class of the instruction, P1 and P2 represent parameters of the instruction, LC represents length of Data field of the instruction, and Le represents number of data bytes of response of the smart key device required by an upper layer application.

Step 102, the smart key device determines type of the instruction, when the type of the instruction is an operating instruction related to a key, executes Step 103, when the type of the instruction is another type of instruction, and executes operating corresponding to the instruction, then going back to Step 101;

In Embodiment 1, that the smart key device determines type of the instruction is that the smart key device parses a received instruction, obtains an instruction type identifier according to specified byte(s) in the instruction, and determines the type of the instruction according to the instruction type identifier;

the smart key device obtains the instruction type identifier according to INS byte in the instruction, and determines the type of the instruction according to the instruction type identifier. INS bytes represent executing class of the instruction;

For example, when the INS byte is 04, the type of the instruction is application selecting instruction; when the INS byte is 20, the type of the instruction is PIN code authenticating instruction; while when the INS byte is 87, the type of the instruction is operating instruction related to the key;

In this case, the operating instruction related to the key includes: signing operating, encrypting operating, and authenticating operating, etc. When the operating instruction related to the key is signing operating, the instruction specifically is: 1087079aff7c820106820081 8201000003ffffffffffffffffffffffffffffffffffffffffffffffffffff ffffffffffffffff ffffffffffffffffffffffffffffffffffffffff ffffffffffffffffffffffffffffffffffffffffffffffffffffffffffff ffffffffffffffffff ffffffffffffffffffffffff0030313 00d060960864801650304020105000 4203d45103 54b4d28 8504e def18917e429f7c6623547800 87 07 9a 0b 1f 03 8b 72 1c d5 86 41 3d 38 1f.

Step 103, the smart key device confirms a key area according to the operating instruction related to the key, then executing Step 104;

In Embodiment 1, that the smart key device confirms a key area according to the operating instruction related to the key is that the smart key device parses the received operating instruction, obtains a key area identifier according to specified byte(s) in the instruction, and confirms the key area according to the key area identifier.

Specifically, the key area identifier includes 9a, 9c, 9d, and 9e; the smart key device obtains the key area identifier according to byte P2 in the instruction.

Step 104, the smart key device obtains a biometric authentication identifier corresponding to the key area, confirms a mode of biometric authentication corresponding to the key area according to the biometric authentication identifier, when the mode of biometric authentication is a first mode, executing Step 105; when the mode of biometric authentication is a second mode, executing Step 106; and when the mode of biometric authentication is a third mode, executing Step 107;

Preferably, the biometric includes: fingerprint, iris, hand shape, facial shape, retina, pulse, auricle, etc.

For example, the biometric in Embodiment 1 is fingerprint; specifically, the biometric authentication identifier is a fingerprint authentication identifier; the modes of the biometric authentication include a first mode 01, a second mode 02, and a third mode 03; when the fingerprint authentication identifier is 01, the mode of the biometric authentication is the first mode, which specifically includes that it does not require to authenticate biometric corresponding to an operating key in an operating process for responding an operating instruction; when the fingerprint authentication identifier is 02, the mode of the biometric authentication is the second mode, which specifically includes that, in a preset time scope, it requires to authenticate the biometric corresponding to the operating key only once in an operating process for responding an operating instruction; when the fingerprint authentication identifier is 03, the mode of the biometric authentication is the third mode, which specifically includes that it requires to authenticate the biometric corresponding to the operating key every time in an operating process for responding an operating instruction, Step 105, the smart key device obtains an operating key corresponding to the key area according to the operating instruction, executes corresponding operation according to the operating key, returns an operating result to the host computer, and executes Step 101;

Specifically, when the operating instruction is for signing operating, the smart key device obtains a signing key in the key area, signs corresponding data via a signing key according to a preset algorithm, returns a signing result to the host computer, and executes Step 101.

Step 106, the smart key device authenticates biometric, determines whether biometric authentication is successful, if biometric authentication is successful, records time of a timer when the biometric authentication is successful, obtains the operating key corresponding to the key area according to the operating instruction, performs corresponding operation according to the operating key, returns an operating result to the host computer, and executes Step 101; while if biometric authentication is not successful, returns an error code, and executes Step 101;

In Embodiment 1, that the smart key device authenticates biometric includes: the smart key device prompts a user to authenticate biometric via a prompting module, comparing obtained biometric information with biometric information stored by the smart key device, if the obtained biometric information and biometric information stored by the smart key device are matched, biometric authentication is successful, otherwise, the biometric authentication is failed.

Step 107, the smart key device obtains a current time of a timer and the recording time of the timer when biometric authentication is successful, determines whether biometric authentication is required according to the current time of the timer and the recording time of the timer when biometric authentication is successful, if yes, executes Step 106; otherwise, obtains the operating key corresponding to the key area according to the operating instruction, executes operating corresponding to the operating key, returns an operating result to the host computer, and executes Step 101.

Preferably, determining whether biometric authentication is required according to the current time of the timer and the recording time of the timer when the biometric authentication is successful includes: the smart key device computes difference between the current time of the timer and the recording time of the timer when the biometric authentication is successful, determines whether the difference overpasses a preset value, if the difference overpasses the preset value, an authenticating biometric is required; while if the difference does not overpass the preset value, an authenticating biometric is not required.

Preferably, the preset value can be 2 minutes.

Preferably, in Embodiment 1, when the mode of biometric authentication is a third mode, the method further includes: the smart key device determines whether the recording time of the timer when the biometric authentication is successful can be obtained, when the smart key device can obtain the recording time of the timer when the biometric authentication is successful, executing Step 107; while when the smart key device cannot obtain the recording time of the timer when the biometric authentication is successful, execute Step 106.

Preferably, in Embodiment 1, said another type of instruction comprises application selecting instruction; that when the type of the instruction is the application selecting instruction, the smart key device executes corresponding operation includes: the smart key device selects an application corresponding to an application identifier in the application selecting instruction, returns application selecting response data to the host computer, and executes Step 101.

Specifically, that the smart key device selects an application corresponding to an application identifier in the application selecting instruction includes: the smart key device obtains an application identification, i.e. AID (Application Identifier), from data field of the application selecting instruction, determines whether an AID, which is matched the obtained AID, can be found in an application identification list stored in the smart key device, if yes, the smart key device selects an application corresponding to the AID.

Specifically, returning application selecting response data to the host computer includes returning response data that application is selected successfully or returning response data that application is selected failed.

In this case, the application selecting instruction is 00 a4 04 00 09 a0 00 00 03 97 42 54 46 59; in which includes selecting header, i.e. 00 a4 04 00 and application number, i.e. a0 00 00 03 97 42 54 46 59; and That application is selected successfully includes a status code of successful application selecting; and that application is selected failed includes a status code of failed application selecting.

For example, the status code of successful application selecting is 9000; while the status code of failed application selecting is 0000.

Preferably, in Embodiment 1, the another type of instruction includes: key pair generating instruction; when the type of the instruction is the key pair generating instruction, executing operating corresponding to the instruction includes: the smart key device confirms a key area according to the key pair generating instruction, obtains the biometric authentication identifier in the key pair generating instruction, sets a mode of biometric authentication corresponding to the key area according to the obtained biometric authentication identifier, obtains the key pair and stores the key pair into the key area, returns response data to the host computer, and executes Step 101.

Specifically, the smart key device confirms the key area according to the key pair generating instruction includes: the smart key device parses the key pair generating instruction, obtains a key area identifier according to specified byte(s) in the key pair generating instruction, and confirms the key area according to the key area identifier.

Preferably, the smart key device has four key areas; the four key areas have different key pairs and certificates from each other, which indicate different key functions. A key area can correspond multiple kinds of operation; in this case, the key area identifier includes 9a, 9c, 9d, and 9e; specifically, 9a is authentication key area; 9c is digital signing key area; 9d is key management key area; and 9e is card authenticating key area.

The smart key device obtains a key area identifier according to the specified byte P2 in the key pair generating instruction and confirms the key area according to the key area identifier.

Specifically, obtaining the biometric authentication identifier in the key pair generating instruction, setting a mode of biometric authentication corresponding to the key area according to the obtained biometric authentication identifier comprises: the smart key device parses a biometric authentication mode setting instruction, obtains a biometric authentication mode setting label according to data field in the key pair instruction, and obtains the biometric authentication mode identifier according to the biometric authentication mode setting label; the smart key device obtains a biometric authentication mode label corresponding to the key area, and assigns the obtained biometric authentication mode identifier to the value of the biometric authentication mode label.

For example, the biometric authentication mode setting label is bc; the biometric authentication mode identifier is 01, 02, or 03.

Preferably, when the biometric authentication identifier obtained by the smart key device is related to others, the smart key device can set a corresponding identifier and further can return an error message to the host computer.

Preferably, that the smart key device obtains the key pair and stores the key pair into the key area includes: the smart key device generates key pair according to the biometric authentication mode setting instruction and stores the key pair in the key area.

Preferably, that the smart key device obtains the key pair and stores the key pair into the key area further includes: the smart key device obtains the key pair contained in the data field of the biometric authentication mode setting instruction and stores the key pair in the key area.

Preferably, in Embodiment 1, said another type of instruction includes: PIN code authenticating instruction; when said another type of instruction is PIN code authenticating instruction, executing corresponding operation includes: the smart key device authenticates the PIN code according to the PIN code authenticating instruction, if the authenticating is successful, sets a PIN code status identifier bit and returns an authenticating result to the host computer, execute Step 101.

In Embodiment 1, that the smart key authenticates the PIN code according to the PIN code authenticating instruction includes: the smart key obtains the PIN code in the data field according to the PIN code authenticating instruction, and compares the obtained PIN code and the PIN code stored by the smart key device. If they are matched, authenticating PIN code is successful; otherwise, authenticating PIN code is failed;

Preferably, that the smart key device sets the PIN code status identifier bit if the smart key device authenticates the PIN code successfully includes: the smart key device searches for the PIN status identifier, and modifies the PIN status identifier corresponding to the PIN status identifier bit to be a specified value. For example, the PIN status identifier is: F_UNLOCKED, when the value corresponding to the PIN status identifier bit is 00, it represents that the PIN status identifier is reset; while when the value corresponding to the PIN status identifier bit is 01, it represents that the PIN status identifier is set.

Specifically, returning an authenticating result to the host computer includes: data of successful authenticating PIN code or data of failed authenticating PIN code.

In Embodiment 1, after the smart key device confirms the key area according to the operating instruction related to the key, the method further includes: the smart key device obtains a PIN code authentication identifier corresponding to the key area, and confirms a PIN code authentication mode corresponding to the key area according to the PIN code authentication identifier, when the PIN code authentication mode is a first mode, executing Step 104;

When the PIN code authentication mode is a second mode, the smart key device obtains a PIN code status identifier bit corresponding to the key area, and determines the status of the PIN status identifier bit, if the status of the PIN status identifier bit is set, Step 104 is executed, while if the status of the PIN status identifier bit is reset, sends error information to the host computer, Step 101 is executed.

Preferably, when the smart key device determines that the status of the PIN code status identifier bit is set, the method further includes that the smart key device resets the PIN code status identifier bit.

Preferably, the PIN code authentication modes include a first mode 01, a second mode 02, and a third mode 03; when the PIN code authentication identifier is 01, the PIN code authentication mode is the first mode, which specifically includes that it does not require to authenticate a PIN code corresponding to an operating key in an operating process of responding an operating instruction; when the PIN code authentication identifier is 02, the PIN code authentication mode is the second mode, which specifically includes that, between successfully selecting an application for the first time and selecting an application for the second time, it requires to authenticate the PIN code corresponding to the operating key only once in an operating process of responding an operating instruction; and when the PIN code authentication identifier is 03, the PIN code authentication mode is the third mode, which specifically includes that it requires to authenticate the PIN code corresponding to the operating key every time in an operating process of responding an operating instruction.

The PIN status identifier is: F_UNLOCKED; when the value of the PIN code status identifier bit is 00, it represents that the PIN status identifier is reset; while when the value of the PIN code status identifier bit is 01, it represents that the PIN status identifier is set. Preferably, in Embodiment 1, said another type of instruction includes: mutual authentication request instruction.

When the another type of instruction is mutual authentication request instruction, executing corresponding operation specifically is that the smart key device parses the mutual authentication request instruction, obtains mutual authentication request data, generates a challenge value according to the mutual authentication request data and storing the challenge value, generates authentication request response data according to the challenge value and sends authentication request response data to the host computer, then Step 101 is executed;

For example, that the smart key device generates the challenge value includes that the smart key device generates the challenge value: 3c9b0ea8731313e6.

Preferably, in Embodiment 1, said another type of instruction includes mutual authentication response instruction;

When the another type of instruction is mutual authentication response instruction, executing operating corresponding to the instruction includes: the smart key device parses the mutual authentication response instruction, obtains mutual authentication response data, obtains a preset key, decrypts the mutual authentication response data according to the preset algorithm via the preset key to obtain a first plaintext, compares the first plaintext with a stored challenge value to obtain a comparing result, sends the comparing result to the host computer, and executes Step 101.

Specifically, the preset key is a pre-stored communication key which is obtained by an agreement made by the smart key device and the host computer. In this case, the preset algorithm is encrypting algorithm, for example, the encryption algorithm of DesEcb.

Specifically, the mutual authentication response data obtained by the smart key device is: bd50f30c85b48906.

Embodiment 2

Figure 2:
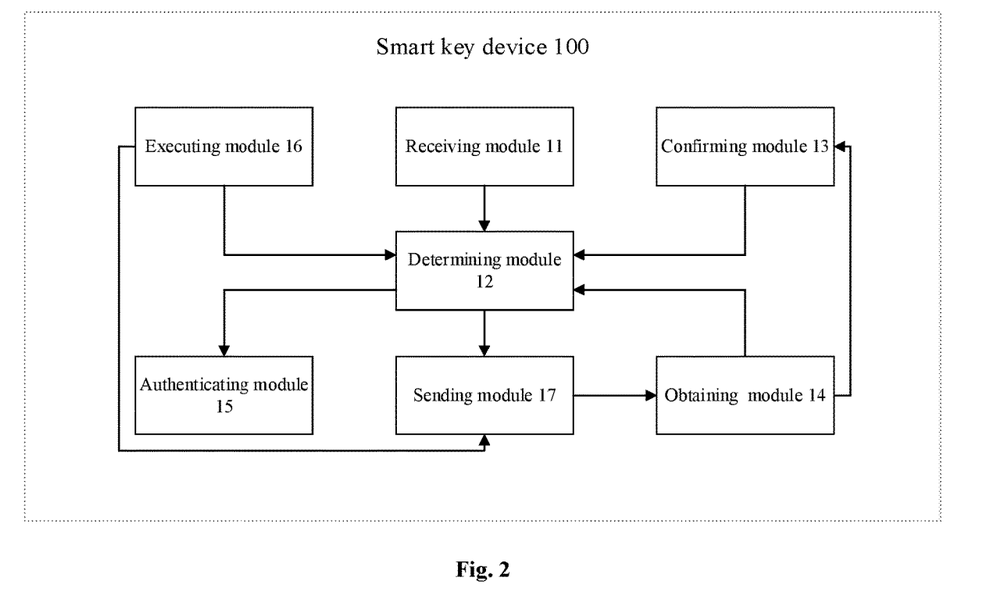
FIG. 2 is a block diagram of a smart key device according to Embodiment 2 of the present invention.

Embodiment 2 provides a smart key device 100, which includes: a receiving module 11, a determining module 12, a confirming module 13, an obtaining module 14, an authenticating module 15, an executing module 16, and a sending module 17.

In this case, the receiving module 11 is configured to receive an instruction from a host computer.

In Embodiment 2, the instruction received by the receiving module 11 complies with format of APDU, which is CLA INS P1 P2 LC Data Le.

Specifically, in Embodiment 2, CLA represents an application type of the instruction, INS represents executing class of the instruction, P1 and P2 represent parameters of the instruction, LC represents length of Data field of the instruction, and Le represents number of data bytes of response of the smart key device required by an upper layer application.

In this case, the determining module 12 is configured to determine a type of the instruction received by the receiving module 11.

Preferably, when the determining module 12 is configured to determine the type of instruction, the determining module 12 specifically is configured to: parse the received instruction, obtain an instruction type identifier according to specified byte(s) in the instruction, and determine the type of the instruction according to the instruction type identifier.

In this case, the confirming module 13 is configured to, when the determining module 12 determines that the type of the instruction is an operating instruction related to a key, confirm a key area according to the operating instruction, obtain a biometric authentication identifier corresponding to the key area, and confirm a mode of biometric authentication corresponding to the key area according to the biometric authentication identifier.

Preferably, when the confirming module 13 is configured to confirm the key area according to the operating instruction, the confirming module 13 is specifically configured to parse the operating instruction, obtain a key identifier according to the specified byte(s) in the instruction, and confirm the key area according to the key area identifier.

In this case, the obtaining module 14 is configured to obtain an operating key in the key area, and execute operation corresponding to the operating key to obtain an operating result.

In this case, the authenticating module 15 is configured to authenticate biometric.

In this case, the determining module 12 is further configured to determine whether the authenticating module authenticates biometric successfully.

In this case, the obtaining module 14 is further configured to, when the determining module 12 determines that the authenticating module authenticates biometric successfully, obtain and record time of a timer when the biometric is authenticated successfully.

In this case, the obtaining module 14 is further configured to, when the confirming module 13 confirms that the mode of the biometric authentication is a third mode, obtain the current time of the timer and record time of a timer when the biometric is authenticated successfully.

Specifically, the obtaining module 14 includes a first obtaining sub-module;

the first obtaining sub-module is specifically configured to obtain the current time of the timer and the recording time of the timer when biometric authentication is successful; and when the confirming module 13 confirms that the mode of biometric authentication is a third mode, the determining module 12 is further configured to determine whether the recording time of the timer when biometric authentication is successful can be obtained, when the determining module 12 determines that the recording time of the timer when biometric authentication is successful can be obtained, the determining module 12 is further configured to trigger the first obtaining sub-module; the confirming module 13 is further configured to trigger the authenticating module 15 when the determining module 12 determines that the recording time of the timer when biometric authentication is successful cannot be obtained.

In this case, the determining module 12 further is configured to determine whether the biometric authentication is required according to the current time of the timer and the recording time of the timer when biometric authentication is successful, of which both the current time and the recording time are obtained by the obtaining module 14.

Preferably, when the determining module 12 is configured to determine whether the biometric authentication is required according to the current time of the timer and the recording time of the timer when biometric authentication is successful, of which both the current time and the recording time are obtained by the obtaining module 14, the determining module 12 includes a first computing unit and a first determining unit;

the first computing unit is configured to compute difference between the current time of the timer and the recording time of the timer when biometric authentication is successful; and the first determining unit is configured to determine whether the difference overpasses a preset value, if the difference overpasses the preset value, biometric authentication is required; if the difference does not overpass the preset value, biometric authentication is not required.

In this case, the sending module 17 is configured to return the operating result to the host computer.

In this case, the sending module 17 is further configured to, when the determining module 12 determines that the authenticating module 15 authenticates the biometric unsuccessfully, return error to the host computer.

In this case, the executing module 16 is configured to, when the determining module 12 determines that the type of the instruction is said another type of instruction, execute corresponding operation.

Preferably, said another type of instruction includes application selecting instruction;

the executing module 16 includes: an application selecting unit and a first sending unit;

the application selecting unit is configured to select an application corresponding to an application identifier in the application selecting instruction; and the first sending unit is configured to return application selecting response data to the host computer.

Preferably, said another type of instruction includes: key pair generating instruction;

the executing module 16 includes: a confirming unit, a first obtaining unit, a first setting unit, a generating unit and a second sending unit;

the confirming unit is configured to confirm a key area according to the key pair generating instruction;

the first obtaining unit is configured to obtain the biometric authentication identifier in the key pair generating instruction;

the first setting unit is configured to set a mode of biometric authentication corresponding to the key area according to the obtained biometric authentication identifier;

the generating unit is configured to generate the key pair and store the key pair in the key area; and the second sending unit is configured to return response data to the host computer.

Preferably, the confirming unit specifically is configured to: parse the key pair generating instruction, obtain the key area identifier according to the specified byte in the key pair generating instruction, and confirm the key area according to the key area identifier.

Preferably, the obtaining unit specifically is configured to parse the key pair generating instruction, obtain a biometric authentication mode setting label according to data field in the key pair generating instruction, obtain the biometric authentication mode identifier according to the biometric authentication mode setting label, and obtain a biometric authentication mode label corresponding to the key area, and the first setting unit specifically is configured to assign the obtained biometric authentication mode identifier to the value of the biometric authentication mode label.

Preferably, said another type of instruction includes: PIN code authenticating instruction;

the executing module 16 includes: an authenticating unit, a second setting unit, and a third sending unit;

the authenticating unit is configured to authenticate PIN code according to the PIN code authenticating instruction;

the second setting unit is configured to, when the authenticating made by the authenticating unit is successful, set a PIN code status identifier bit to be in setting status; and the third sending unit is configured to send an authenticating result to the host computer.

Preferably, the obtaining module 14 is further configured to obtain a PIN code authentication identifier corresponding to the key area;

the confirming module 13 is further configured to confirm PIN code authentication mode corresponding to the key area according to the PIN code authentication identifier;

the obtaining module 14 includes a second obtaining sub-module;

the second obtaining sub-module is configured to obtain a biometric authentication identifier corresponding to the key area; when the confirming module confirms that the PIN code authentication mode is the first mode, the confirming module triggers the second obtaining sub-module; and the executing module 16 is further configured to, when the confirming module confirms that the PIN code authentication mode is the second mode, obtain a PIN code status identifier bit corresponding to the key area and determine the status of the PIN status identifier bit; the executing module 16 is further configured to trigger the second obtaining sub-module when the status of the PIN status identifier bit is set, and trigger the receiving module 11 when the status of the PIN status identifier bit is in resetting status.

Preferably, the executing module 16 includes a second setting unit; and the second setting unit is configured to, when the executing module 16 determines that the status of the PIN code status identifier bit is in setting status, reset the PIN status identifier bit and trigger the second obtaining sub-module.

Preferably, said another type of instruction specifically includes: mutual authentication request instruction; and the executing module 16 is configured to parse the mutual authentication request instruction, obtain mutual authentication request data, generate a challenge value according to the mutual authentication request data and store the challenge value, generate authentication request response data according to the challenge value, and send authentication request response data to the host computer according to the challenge value.

Preferably, said another type of instruction includes: mutual authentication response instruction; and the executing module 16 is configured to parse the mutual authentication response instruction, obtain mutual authentication response data, obtain a preset key, decrypt the mutual authentication response data according to the preset algorithm via the preset key to obtain a first plaintext, compare the first plaintext with a stored challenge value to obtain a comparing result, and send the comparing result to the host computer.

Preferably, the operating instruction related to the key includes: a signing instruction, and/or authenticating instruction, and/or encrypting instruction, and/or decrypting instruction.

According to the present invention, a user can realize multiple authentication modes of biometric in a process of an authenticating process by using a smart key device, which satisfies a variety of biometric authentication requirements in different application scenarios when using a key. Using the method of the present invention, security is assured in the process of using the key.

The above gives details about the disclosure of a smart key device and an authenticating method thereof. The principles and embodiments of the application are described herein by specific examples, and the descriptions of the embodiments above are only used to help understand the method and core idea of the application. In addition, those skilled in the art can made variations to both specific embodiments and old or new applications according to the idea of the application. In summary, the content of the specification should not be interpreted as limiting the application.

The invention claimed is:

1. An authenticating method of a smart key device, in which said method comprises the following steps:
   A1) receiving, by the smart key device, an instruction sent from a host computer;
   A2) determining, by the smart key device, a type of the instruction, when the type of the instruction is an operating instruction related to the key, executing Step A3, when the type of the instruction is another type of instruction, executing an operation corresponding to the instruction, going back to Step A1;
   A3) confirming, by the smart key device, a key area according to the operating instruction related to the key, executing Step A4;
   A4) obtaining, by the smart key device, a biometric authentication identifier corresponding to the key area, confirming a mode of biometric authentication corresponding to the key area according to the biometric authentication identifier, when the mode of biometric authentication is a first mode, executing Step A5; when the mode of biometric authentication is a second mode, executing Step A6; when the mode of biometric authentication is a third mode, executing Step A7;
   A5) obtaining, by the smart key device, an operating key corresponding to the key area according to the operating instruction, executing an operation corresponding to the operating key, returning an operating result to the host computer, then executing Step A1;
   A6) authenticating, by the smart key device, a biometric, determining whether the biometric authentication is successful, if the biometric authentication is successful, obtaining and recording time of a timer when the biometric authentication is successful, obtaining the operating key corresponding to the key area according to the operating instruction, performing a corresponding operation according to the operating key, returning an operating result to the host computer, then executing Step A1; if the biometric authentication is not successful, returning an error code, then executing Step A1; and A7) obtaining, by the smart key device, a current time of the timer and the recording time of the timer when the biometric authentication is successful, determining whether the biometric authentication is required according to the current time of the timer and the recording time of the timer when the biometric authentication is successful, if yes, executing Step A6; otherwise, obtaining the operating key corresponding to the key area according to the operating instruction, executing an operation corresponding to the operating key, returning an operating result to the host computer, then executing Step A1.

2. The method of claim 1, wherein determining, by the smart key device, a type of the instruction comprises: parsing, by the smart key device, the received instruction, obtaining an instruction type identifier according to specified byte(s) in the instruction, and determining the type of the instruction according to the instruction type identifier.

3. The method of claim 1, wherein confirming, by the smart key device, a key area according to the operating instruction related to the key comprises: parsing, by the smart key device, the operating instruction, obtaining a key area identifier according to the specified byte(s) in the instruction, and confirming the key area according to the key area identifier.

4. The method of claim 1, wherein in Step A7, determining whether the biometric authentication is required according to the current time of the timer and the recording time of the timer when the biometric authentication is successful comprises:
computing, by the smart key device, difference of the timer between the current time and the recording time of the timer when the biometric authentication is successful, determining whether the difference overpasses a preset value, if the difference overpasses the preset value, an authenticating biometric is required; while if the difference does not overpass the preset value, an authenticating biometric is not required.

5. The method of claim 1, wherein when the mode of the biometric authentication is a third mode, the method further comprises: determining, by the smart key device, whether the recording time of the timer when the biometric authentication is successful can be obtained, when the smart key device can obtain the recording time of the timer when the biometric authentication is successful, executing Step A7; while when the smart key device cannot obtain the recording time of the timer when the biometric authentication is successful, executing Step A6.

6. The method of claim 1, wherein said another type of instruction comprises: application selecting instruction;
executing operation corresponding to the instruction comprises: selecting, by the smart key device, an application corresponding to an application identifier in the application selecting instruction, and returning application selecting response data to the host computer, then executing Step A1.

7. The method of claim 1, wherein said another type of instruction comprises: key pair generating instruction;
executing operation corresponding to the instruction comprises: confirming, by the smart key device, the key area according to the key pair generating instruction, obtaining the biometric authentication identifier in the key pair generating instruction, setting a mode of the biometric authentication corresponding to the key area according to the obtained biometric authentication identifier, obtaining the key pair and storing the key pair into the key area, and returning response data to the host computer, then executing Step A1.

8. The method of claim 7, wherein obtaining the biometric authentication identifier in the key pair generating instruction, and setting a mode of the biometric authentication corresponding to the key area according to the obtained biometric authentication identifier comprises: parsing, by the smart key device, the key pair generating instruction, obtaining a biometric authentication mode setting label according to a data field in the key pair instruction, obtaining the biometric authentication mode identifier according to the biometric authentication mode setting label, obtaining, by the smart key device, a biometric authentication mode label corresponding to the key area, and assigning the obtained biometric authentication mode identifier to the value of the biometric authentication mode label.

9. The method of claim 1, where said another type of instruction comprises: mutual authentication request instruction;
executing operation corresponding to the instruction comprises: parsing, by the smart key device, the mutual authentication request instruction, obtaining mutual authentication request data, generating a challenge value according to the mutual authentication request data and storing the challenge value, generating authentication request response data according to the challenge value, and sending the authentication request response data to the host computer, then executing Step A1.

10. The method of claim 1, wherein said another type of instruction comprises: mutual authentication response instruction;
executing operation corresponding to the instruction comprises: parsing, by the smart key device, the mutual authentication response instruction, obtaining mutual authentication response data, obtaining a preset key, decrypting the mutual authentication response data according to a preset algorithm via the preset key to obtain a first plaintext, comparing the first plaintext with a stored challenge value to obtain a comparing result, and sending the comparing result to the host computer, then executing Step A1.

* * * * *